(12) United States Patent
Fuse (10) Patent No.: US 12,153,839 B2
(45) Date of Patent: Nov. 26, 2024

(54) CLOUD SERVER, CLOUD SYSTEM, AND NON-TRANSITORY COMPUTER-READABLE STORAGE MEDIUM FOR MANAGING PRINT JOBS

(71) Applicant: CANON KABUSHIKI KAISHA, Tokyo (JP)

(72) Inventor: Hiroshi Fuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/331,001

(22) Filed: Jun. 7, 2023

(65) Prior Publication Data

US 2023/0401019 A1 Dec. 14, 2023

(30) Foreign Application Priority Data

Jun. 13, 2022 (JP) ................... 2022-094840

(51) Int. Cl.
*G06F 3/12* (2006.01)
(52) U.S. Cl.
CPC .......... *G06F 3/1236* (2013.01); *G06F 3/1259* (2013.01); *G06F 3/1203* (2013.01)
(58) Field of Classification Search
None
See application file for complete search history.

(56) References Cited

U.S. PATENT DOCUMENTS

| 11,537,346 | B2 | 12/2022 | Suzuki | |
|---|---|---|---|---|
| 2011/0199640 | A1* | 8/2011 | Shirai | G06F 3/1257 358/1.15 |
| 2021/0157539 | A1* | 5/2021 | Suzuki | G06F 21/608 |
| 2021/0382671 | A1* | 12/2021 | Yamamichi | G06F 3/1288 |
| 2023/0244427 | A1* | 8/2023 | Terashima | G06F 3/12 358/1.14 |
| 2023/0266929 | A1* | 8/2023 | Tokunaga | G06F 3/1272 358/1.14 |

FOREIGN PATENT DOCUMENTS

JP 2021086187 A 6/2021

\* cited by examiner

*Primary Examiner* — Akwasi M Sarpong
*Assistant Examiner* — Pawan Dhingra
(74) *Attorney, Agent, or Firm* — Canon U.S.A., Inc. IP Division (57) ABSTRACT

A first cloud server, that provides a first cloud cooperation service, executes instructions to: receive, from an image forming apparatus, a first acquisition request to acquire a print job; acquire information on a first print job managed by the first cloud cooperation service; acquire, from a second cloud server, information on a second print job managed by a second cloud cooperation service and information on a third print job managed by a first print service cooperating with the second cloud cooperation service; and transmit a print job list including the information on the first print job, the information on the second print job, and the information on the third print job to the image forming apparatus.

4 Claims, 6 Drawing Sheets

CLOUD SERVER, CLOUD SYSTEM, AND NON-TRANSITORY COMPUTER-READABLE STORAGE MEDIUM FOR MANAGING PRINT JOBS

BACKGROUND

Field

The present disclosure relates to a cloud server, a cloud system, and a non-transitory computer-readable storage medium.

Description of the Related Art

Nowadays, companies introduce new working forms, such as remote working and satellite office working, to meet increasingly diversified working styles and actively utilize cloud services to further improve efficiency of business. As a result, image forming apparatuses (printers) that have been mainly used in offices are used irrespective of places, and cloud migration of software relating to printing has been in progress.

For example, all of printer servers and relating management services can be provided in cloud space, and management of print jobs and other jobs can be performed on the cloud. Such cloud services can be used from an image forming apparatus, and users can select a service that meets the user's need. In a case of using an image forming apparatus cooperating with cloud services, a user acquires a job list on a desired cloud service by logging in a certain cloud service from the image forming apparatus. However, in a case where the user uses a plurality of cloud services, it is necessary for the user to previously know which cloud service holds a job to be printed, and to log in the cloud service from the image forming apparatus.

Japanese Patent Application Laid-Open No. 2021-86187 discusses a technique that displays a list of print jobs managed by a plurality of cloud services connected to a cloud cooperation service, to enable the user to select a print job without consideration of connections of the plurality of cloud services.

SUMMARY

According to an aspect of the present disclosure, a cloud server that provides a first cloud cooperation service, the cloud server includes at least one memory that, when executing the instructions, stores instructions, and at least one processor that executes the instructions to receive, from an image forming apparatus, a first acquisition request to acquire a print job, acquire information on a first print job managed by the first cloud cooperation service, transmit, to a second cloud server that provides a second cloud cooperation service cooperating with the first cloud cooperation service, a second acquisition request to acquire information on a second print job managed by the second cloud cooperation service and information on a third print job managed by a first print service cooperating with the second cloud cooperation service, acquire the information on the second print job and the information on the third print job from the second cloud server, and transmit a print job list including the information on the first print job, the information on the second print job, and the information on the third print job to the image forming apparatus.

Further features of various embodiments will become apparent from the following description of exemplary embodiments with reference to the attached drawings.

DESCRIPTION OF THE EMBODIMENTS

Preferred exemplary embodiments of the present disclosure are described below with reference to drawings. The following exemplary embodiments do not limit the disclosure according to the claims, and all of combinations of features described in the exemplary embodiments are not necessarily essential for solving means of the disclosure.

In recent years, with increase in the variety of work places of users, a satellite office (shared office), a home, and the like can be used as a work place in addition to a main office of, for example, a company. In the main office and the satellite office, an external cloud service (print service, etc.) is often usable via a cloud cooperation service managed by each office. In an example of FIG. 1, a cloud cooperation service 120 is usable in a satellite office, and a cloud cooperation service 121 is usable in a main office. Further, the cloud cooperation service 120 is connected to a print service 130 and an external service 140. In this case, an image forming apparatus 110 and a client terminal 110 in the satellite office each can access the print service 130 and the external service 140 via the cloud cooperation service 120. Further, the cloud cooperation service 121 is connected to a print service 131 and an external service 141. In this case, an image forming apparatus 111 and a client terminal 101 in the main office each can access the print service 131 and the external service 141 via the cloud cooperation service 121.

Figure 1:
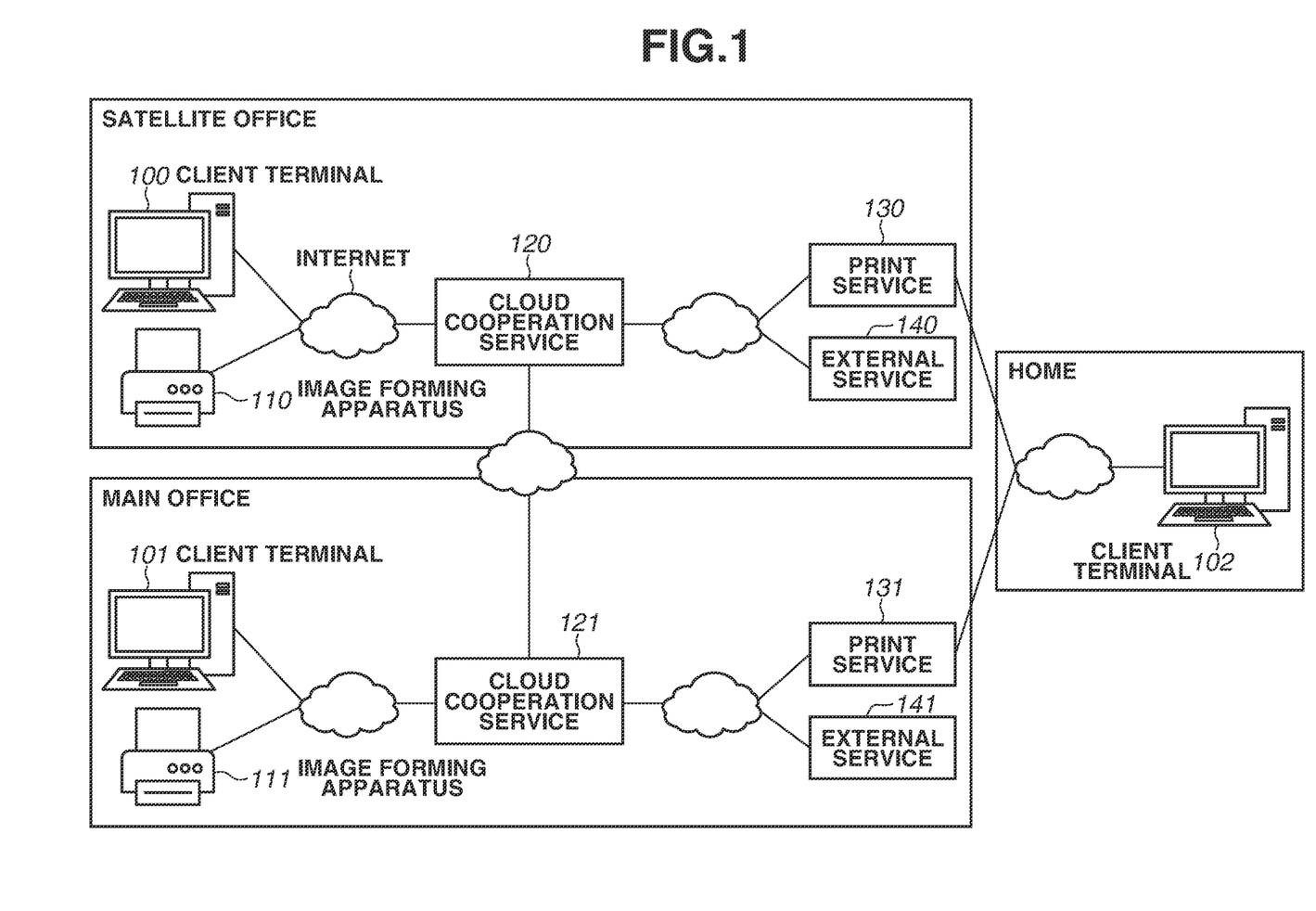
FIG. 1 is a diagram illustrating an entire configuration of a cloud system.

In this system, if the method discussed in Japanese Patent Application Laid-Open No. 2021-86187 is used, for example, the image forming apparatus 110 can acquire a list of jobs from each of the services connected to the cloud cooperation service 120, and display the list. In other words, the image forming apparatus 110 in the satellite office can acquire a list of jobs from each of the print service 130 and the external service 140 connected to the cloud cooperation service 120, and display the lists. Next, a case where the cloud cooperation service 120 and the cloud cooperation service 121 are connected to each other is described. If the method discussed in Japanese Patent Application Laid-Open No. 2021-86187 is used in this case, the image forming apparatus 110 in the satellite office can acquire lists of jobs of three services, i.e., print service 130, external service 140, and cloud cooperation service 121, connected to the cloud cooperation service 120. However, since the cloud cooperation service 120 is not connected to the print service 131, displaying jobs of the print service 131 may fail with the method discussed in Japanese Patent Application Laid-Open No. 2021-86187.

In the following description, a configuration in which the image forming apparatus 110 in the satellite office displays information on a print job of the print service 131 is described.

In FIG. 1, each of the client terminal 100, the client terminal 101, and a client terminal 102 uploads print data to the cloud cooperation services 120 and 121 and the print services 130 and 131. Examples of the client terminal include a personal computer and a smartphone having a print data uploading function. Each of the cloud cooperation services 120 and 121 and the print services 130 and 131 is provided by one or a plurality of cloud servers.

Each of the image forming apparatuses 110 and 111 is a multifunctional peripheral having a plurality of functions, such as a scanner function and a printer function.

Each of the cloud cooperation services 120 and 121 has two functions. The cloud cooperation services 120 and 121 are also collectively referred to as a cloud cooperation system. A first function is a print service function of managing print data uploaded from the client terminals 100 and 101 as a print job. In each of the cloud cooperation services 120 and 121, print job list data is managed by the print service function. A second function is an external service cooperation function of managing connection with external services, such as the print services 130 and 131 and the external services 140 and 141.

Each of the print services 130 and 131 is a print service having the print service function of managing print data uploaded from the client terminal 102 as a print job. Examples of the print service include Universal Print available from Microsoft Corporation. In each of the print services 130 and 131, print job list data is managed by the print service function.

Each of the external services 140 and 141 is usable for various applications, such as a storage, a core system, and a business system.

The image forming apparatus 110 can acquire a print job from the print service 130 via the cloud cooperation service 120, and acquire print data from the external service 140. Further, as described below, the cloud cooperation service 120 can acquire a print job from the print service 131, and acquire print data from the external service 141, via the cloud cooperation service 121. In other words, the image forming apparatus 110 can acquire print jobs from the cloud cooperation services 120 and 121 and the print services 130 and 131.

Examples of operating a plurality of services in cooperation with one another in the system according to the present exemplary embodiment include using an authentication and authorization mechanism, such as OAuth. Using such a technique allows the cloud cooperation service 120 to cooperate with the print service 130 and the external service 140, and the cloud cooperation service 121 can cooperate with the print service 131 and the external service 141. Further, the cloud cooperation services 120 and 121 can cooperate with each other.

While, the system according to the present exemplary embodiment has a configuration including the image forming apparatuses 110 and 111 and the cloud cooperation services 120 and 121, the configuration is not limited thereto. For example, the image forming apparatus 110 can also have a role of the cloud cooperation service 120. Further, the cloud cooperation services 120 and 121 can be disposed in a server on a local area network (LAN), but not on the Internet. The above-described components are connected with each other by a network to perform communication. Examples of the network is the Internet, a LAN, a wide area network (WAN), a telephone line, a dedicated digital line, and an asynchronous transfer mode (ATM). Alternatively, the network is a communication network realized by a combination thereof. Any network can be used as long as the network can transmit and receive data.

Figure 2:
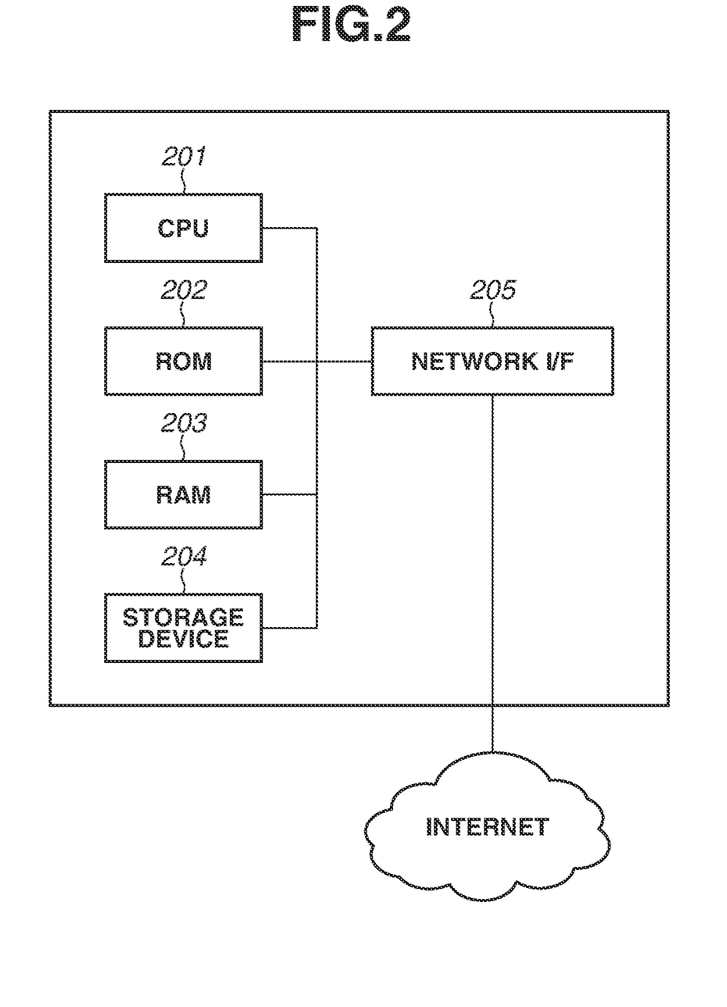
FIG. 2 is a diagram illustrating a hardware configuration of an image forming apparatus.

FIG. 2 is a diagram illustrating a hardware configuration example of an information processing apparatus. The information processing apparatus according to the present exemplary embodiment includes a server computer in a data center in which the cloud cooperation service 120 is constructed. Each of the cloud cooperation service 121, the print services 130 and 131, and the external services 140 and 141 has a similar configuration. Further, a hardware configuration of a common information processing apparatus can be similarly applied to each of the client terminals 100 to 102 and the image forming apparatuses 110 and 111 according to the present exemplary embodiment, and a component not illustrated in FIG. 2 may be further provided.

A central processing unit (CPU) 201 directly or indirectly controls devices (read only memory (ROM), random access memory (RAM), etc.) connected by an internal device, and executes programs to realize the present exemplary embodiment. A ROM 202 stores a basic input/output system (BIOS). A RAM (direct storage device) 203 is used as a work area for the CPU 201, a primary storage area where a software module realizing the present exemplary embodiment is loaded, and the like. A storage device 204 stores an operating system (OS) as basic software, and applications. Specific examples of the storage device 204 include a hard disk drive (HDD) and a solid state drive (SSD). A network interface (I/F) 205 is an interface for connection to the Internet and the network.

Figure 3:
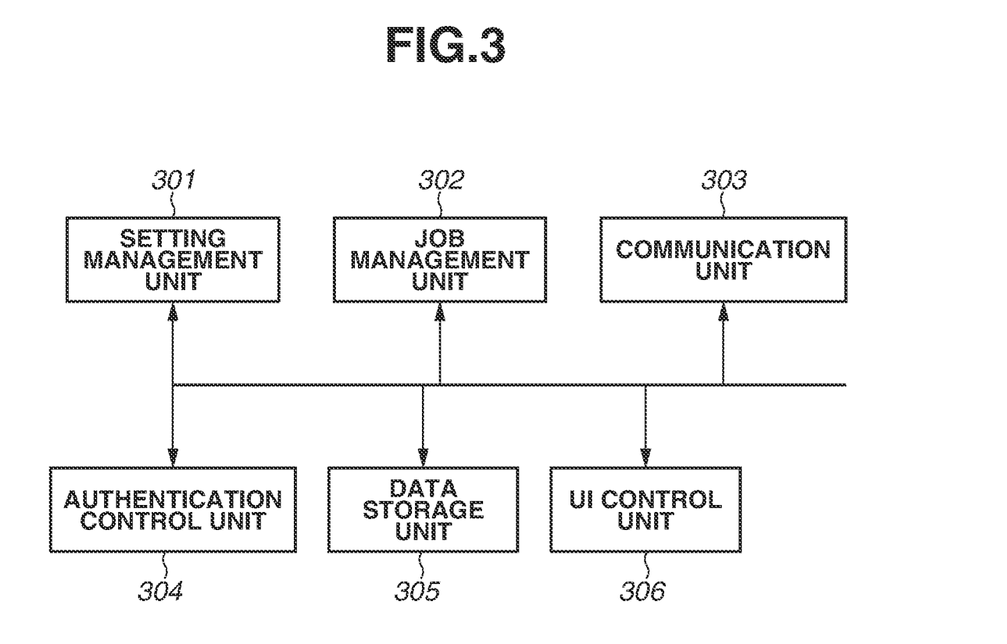
FIG. 3 is a diagram illustrating a software configuration of a cloud cooperation service.

Each of the cloud cooperation services 120 and 121 receives a processing request from each of the client terminals 100 to 102, the image forming apparatuses 110 and 111, and the services 120, 121, 130 and 131 via the network I/F 205, performs various kinds of processing, and transmits and receives information. FIG. 3 is a software configuration diagram of each of the cloud cooperation services 120 and 121. A software configuration of a common information processing apparatus can be similarly applied to each of the print services 130 and 131 according to the present exemplary embodiment.

The software configuration illustrated in FIG. 3 is realized when the CPU 201 reads out programs stored in, for example, the ROM 202 to the RAM 203, and executes the programs. A setting management unit 301 stores settings relating to various kinds of functions of the cloud cooperation service 120 or 121 in the storage devices, such as the RAM 203 and the storage device 204, and reads out the settings from the storage devices. A job management unit 302 stores a job received from the image forming apparatus 110, in a data storage unit 305. A communication unit 303 has a function for connection to each of the components. An authentication control unit 304 has a function of realizing the authentication and authorization mechanism, such as OAuth. A user interface (UI) control unit 306 has a function of realizing UI display on the cloud cooperation service 120 or 121 and various kinds of functions on the UI.

As described below, in the present exemplary embodiment, when the image forming apparatus 110 accesses the cloud cooperation service 120, the image forming apparatus 110 transmits a print job list acquisition request. The cloud cooperation service 120, after receiving the print job list acquisition request, notifies a job list in which print jobs managed by the cloud cooperation service 120 itself, print jobs managed by a print service cooperating with the cloud cooperation service 120, and print jobs managed by a print service further cooperating with the other cloud cooperation service 121 cooperating with the cloud cooperation service 120 are automatically collected. "Print jobs managed by print service cooperating with cloud cooperation service 120" are, for example, jobs managed by the print service 130 in FIG. 1. Further, "print jobs managed by print service further cooperating with the other cloud cooperation service 121 cooperating with cloud cooperation service 120" are, for example, print jobs managed by the print service 131.

Figure 4:
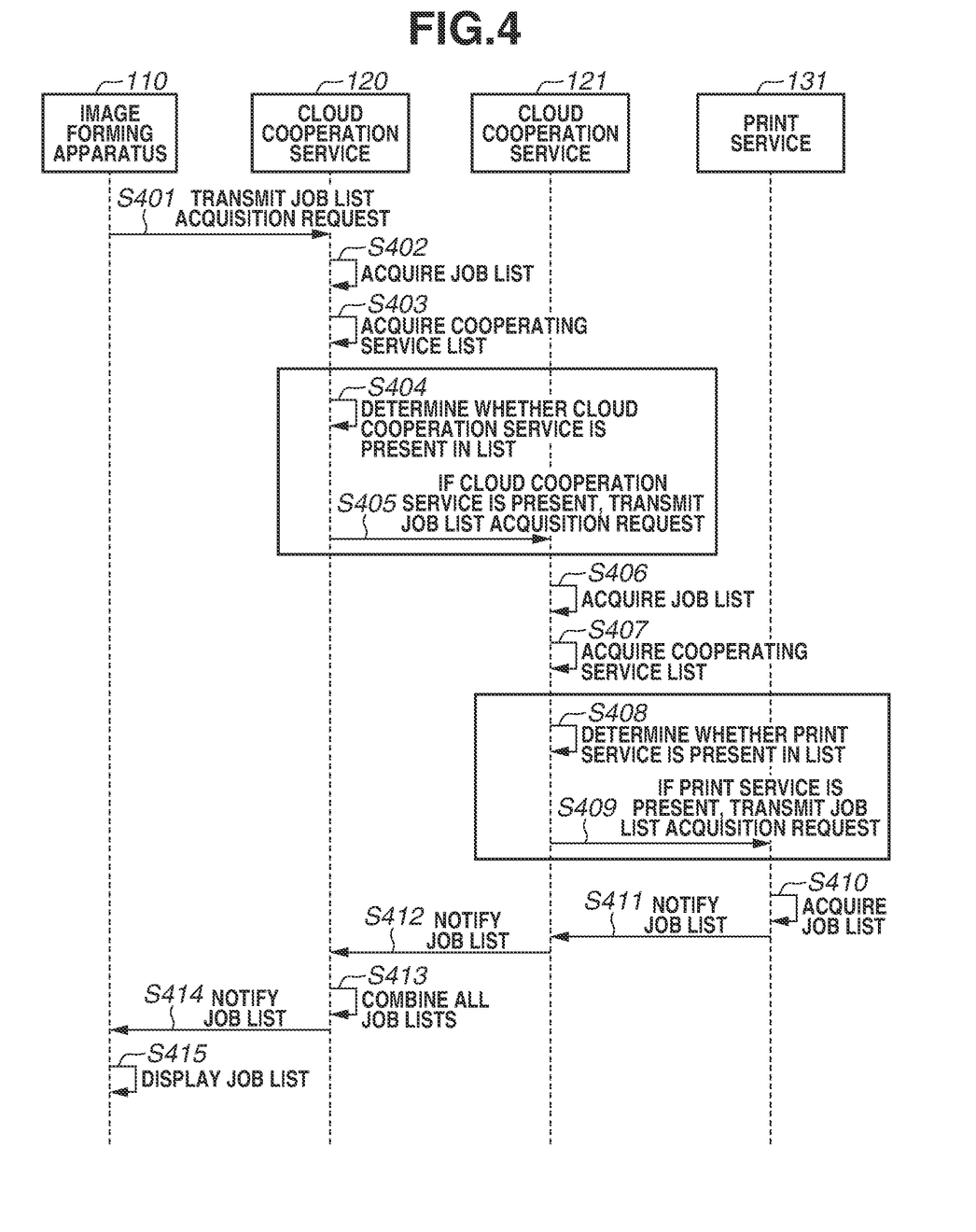
FIG. 4 is a sequence diagram illustrating processing among apparatuses.

FIG. 4 is a sequence diagram illustrating a procedure of processing among the image forming apparatus 110 and the cloud cooperation services 120 and 121. In this procedure, the image forming apparatus 110 collectively displays a list of jobs managed by the cloud cooperation services 120 and 121 and the print service 131.

In step S401, in a case where the image forming apparatus 110 is operated by the user, the image forming apparatus 110 transmits a print job list data acquisition request to the cloud cooperation service 120.

In step S402, the cloud cooperation service 120 acquires a job list (A) that is managed by the cloud cooperation service 120. Table 1 illustrates an example of the job list (A) including a job name and a print setting (color/monochrome). Table 1 includes two jobs of job 1 and job 2. The information acquired as the job list is not particularly limited as long as the information relates to the jobs.

TABLE 1

| Job List (A) | |
|---|---|
| Job Name | Print Setting (Color/Monochrome) |
| Job 1 | Color |
| Job 2 | Monochrome |

In step S403, the cloud cooperation service 120 acquires a service list (A) indicating cooperating services. Table 2 illustrates an example of the service list (A) including a service name and a service uniform resource locator (URL). Table 2 includes the print service 130, the external service 140, and the cloud cooperation service 121, which means that the three services cooperate with the cloud cooperation service 120. The information acquired as the service list is not particularly limited as long as the information is information (service management data) relating to the services cooperating with the cloud cooperation service 120.

TABLE 2

| Service List (A) | |
|---|---|
| Service Name | Service URL |
| Print Service 130 | http://srv130.print.com/ |
| External Service 140 | http://srv140.storage.com/ |
| Cloud Cooperation Service 121 | http://srv121.image-handle.com/ |

In step S404, the cloud cooperation service 120 determines whether the cloud cooperation service 121 different from the cloud cooperation service 120 is present in the service list (A). For example, in a case where an optional domain, such as "image-handle.com", is included in the service URL of the service list (A) acquired in step S403, the cloud cooperation service 120 determines that the cloud cooperation service 121 is present in the service list (A). In a case where the cloud cooperation service 120 determines that the cloud cooperation service 121 is present, the processing proceeds to step S405. In a case where the cloud cooperation service 120 determines that the cloud cooperation service 121 is absent, the processing proceeds to step S414. While presence and absence of the other cloud cooperation service, which is the cloud cooperation service 121 in the present exemplary embodiment, is determined based on the domain URL, the determination is not particularly limited to it as long as presence and absence can be determined.

In step S405, the cloud cooperation service 120 transmits, to the cloud cooperation service 121, an acquisition request of a job list relating to print jobs managed by the cloud cooperation service 121 and print jobs managed by the print service cooperating with the cloud cooperation service 121.

In step S406, the cloud cooperation service 121 acquires a job list (B) that is managed by the cloud cooperation service 121 itself. Table 3 illustrates an example of the job list (B) including a job name and print setting. Table 3 includes one job named job 3. The information acquired as the job list is not particularly limited to the above described list as long as the information relates to the jobs.

TABLE 3

| Job List (B) | |
|---|---|
| Job Name | Print Setting (Color/Monochrome) |
| Job 3 | Color |

In step S407, the cloud cooperation service 121 acquires a service list (B) of cooperating services. Table 4 illustrates an example of the service list (B), and includes a service name and a service URL. Table 4 includes the print service 131 and the external service 141, and the two services cooperate with the cloud cooperation service 121.

TABLE 4

| Service List (B) | |
|---|---|
| Service Name | Service URL |
| Print Service 131 | http://srv131.print.com/ |
| External Service 141 | http://srv141.storage.com/ |

In step S408, the cloud cooperation service 121 determines whether the print service 131 is present in the service list (B). For example, in a case where an optional domain, such as "print.com", is included in the service URL of the service list (B) acquired in step S407, the cloud cooperation service 121 determines that the print service 131 is present in the service list (B). In a case where the cloud cooperation service 121 determines that the print service 131 is present, the processing proceeds to step S409. In a case where the cloud cooperation service 121 determines that the print service 131 is absent, the processing proceeds to step S412. While, the presence and absence of the print service 131 is determined based on the domain URL in the present exemplary embodiment, the determination can be performed based on other information as long as presence and absence can be determined.

In step S409, the cloud cooperation service 121 transmits a job list acquisition request to the print service 131.

In step S410, the print service 131 acquires a job list (C) that is managed by the print service 131 itself. Table 5 illustrates an example of the job list (C) including a job name and print setting. Table 5 includes one job named job 4. The information acquired as the job list is not particularly limited to the above described information as long as the information relates to the jobs.

TABLE 5

| Job List (C) | |
| --- | --- |
| Job Name | Print Setting (Color/Monochrome) |
| Job 4 | Monochrome |

In step S411, the print service 131 notifies the cloud cooperation service 121 of the job list (C).

In step S412, the cloud cooperation service 121 notifies the cloud cooperation service 120 of the job list (B) and the job list (C). In a case where the job list (C) is not present, only the job list (B) is notified.

The processing in steps S408 to S411 performed between the cloud cooperation service 121 and the print service 131 is also performed between the cloud cooperation service 120 and the print service 131. More specifically, the cloud cooperation service 120 determines whether the print service 130 is present in the service list (A) of the services cooperating with the cloud cooperation service 120, acquired in step S403. In a case where the cloud cooperation service 120 determines that the print service 130 is present, the cloud cooperation service 120 transmits a job list acquisition request to the print service 130, and acquires a job list (D) from the print service 130. In a case where no print job is managed in the print service 130, absence of the target print job is notified.

In step S413, the cloud cooperation service 120 combines the job list (A), the job list (B), the job list (C), and the job list (D). The job list not notified to the cloud cooperation service 120 is not combined. For example, in a case where no print job is managed in the print service 130, the job list (D) is not notified. Thus, the job list (A), the job list (B), and the job list (C) are combined as illustrated in Table 6.

TABLE 6

| Combined Job List (A + B + C) | |
| --- | --- |
| Job Name | Print Setting (Color/Monochrome) |
| Job 1 | Color |
| Job 2 | Monochrome |
| Job 3 | Color |
| Job 4 | Monochrome |

In step S414, the cloud cooperation service 120 notifies the image forming apparatus 110 of the job list combined in step S413. In a case where the job list (B) or the job list (C) does not exist, only the existing job list is transmitted.

In step S415, the image forming apparatus 110 performs display control to display the acquired job list on the display unit (not illustrated) by using the job list.

By the job list display procedure described in the present exemplary embodiment, the job lists managed by the cloud cooperation services 120 and 121 and the print services 130 and 131 can be collectively displayed on a UI panel (not illustrated) of the image forming apparatus 110. The print job list is displayed on a screen 504 in FIG. 5 only by a user operation that is performed on the UI panel of the image forming apparatus 110 to transmit the job list acquisition request to the cloud cooperation service 120. Thus, the user can select a desired print job with the simple operation.

Figure 5:
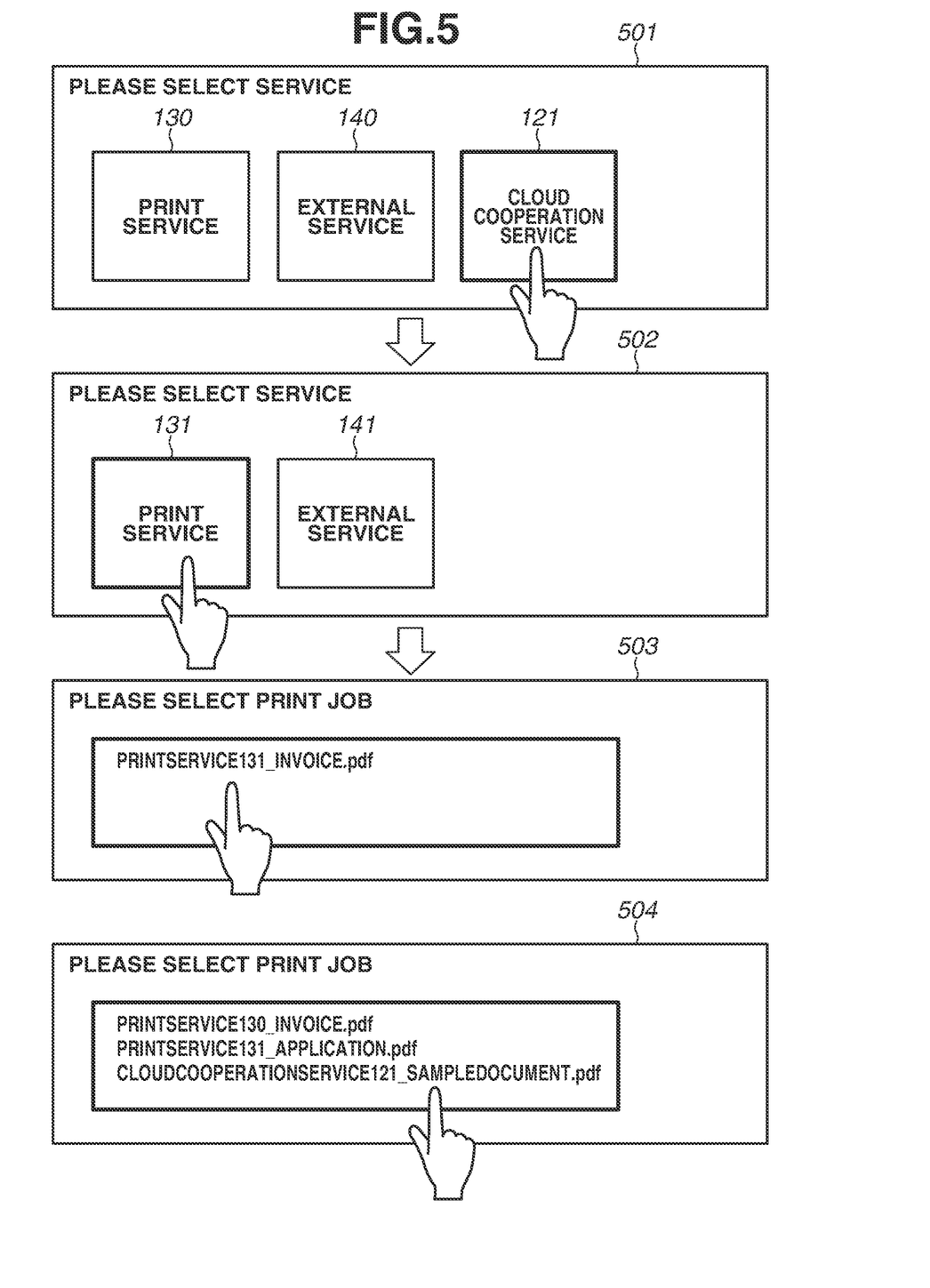
FIG. 5 is a diagram illustrating screens of the image forming apparatus.

Without the above-described function according to the present exemplary embodiment, the user is required to select a desired service to display jobs managed by the desired service. For example, when the user accesses the cloud cooperation service 120 on the UI panel of the image forming apparatus 110, a screen 501 on which the user selects any of the services 130, 140, and 121 cooperating with the cloud cooperation service 120 is displayed. When the user selects the cloud cooperation service 121 on the screen 501, a screen 502 on which the user selects any of the print service 131 and the external service 141 cooperating with the cloud cooperation service 121 is displayed. Further, when the user selects the print service 131 on the screen 502, the print jobs managed by the print service 131 are displayed on a screen 503. In other words, without the function as described in the present exemplary embodiment, the number of times of screen operation performed by the user is increased.

While, in the present exemplary embodiment, the service list information is acquired every time the user performs an operation, in a case where the service list information has been acquired in the past, cache information acquired in the previous processing can be used and the series of processing can be skipped.

In the above-described first exemplary embodiment, the print jobs are collectively displayed on the image forming apparatus 110 in a case where the cloud cooperation services 120 and 121 cooperate with the different print services which are the print services 130 and 131, respectively. In this case, however, in a case where the cloud cooperation services 120 and 121 cooperate with the print service 131, and if the cloud cooperation services 120 and 121 individually acquire the print job list from the print service 131, the same print job may be redundantly displayed on the UI panel of the image forming apparatus 110.

Thus, in a second exemplary embodiment, a description will be given of hiding the redundant print job on the UI panel, which is a process added to the procedure according to the first exemplary embodiment. In the present exemplary embodiment, redundant descriptions of the system configuration, the UIs of the application, and the like similar to the first exemplary embodiment are omitted.

Figure 6:
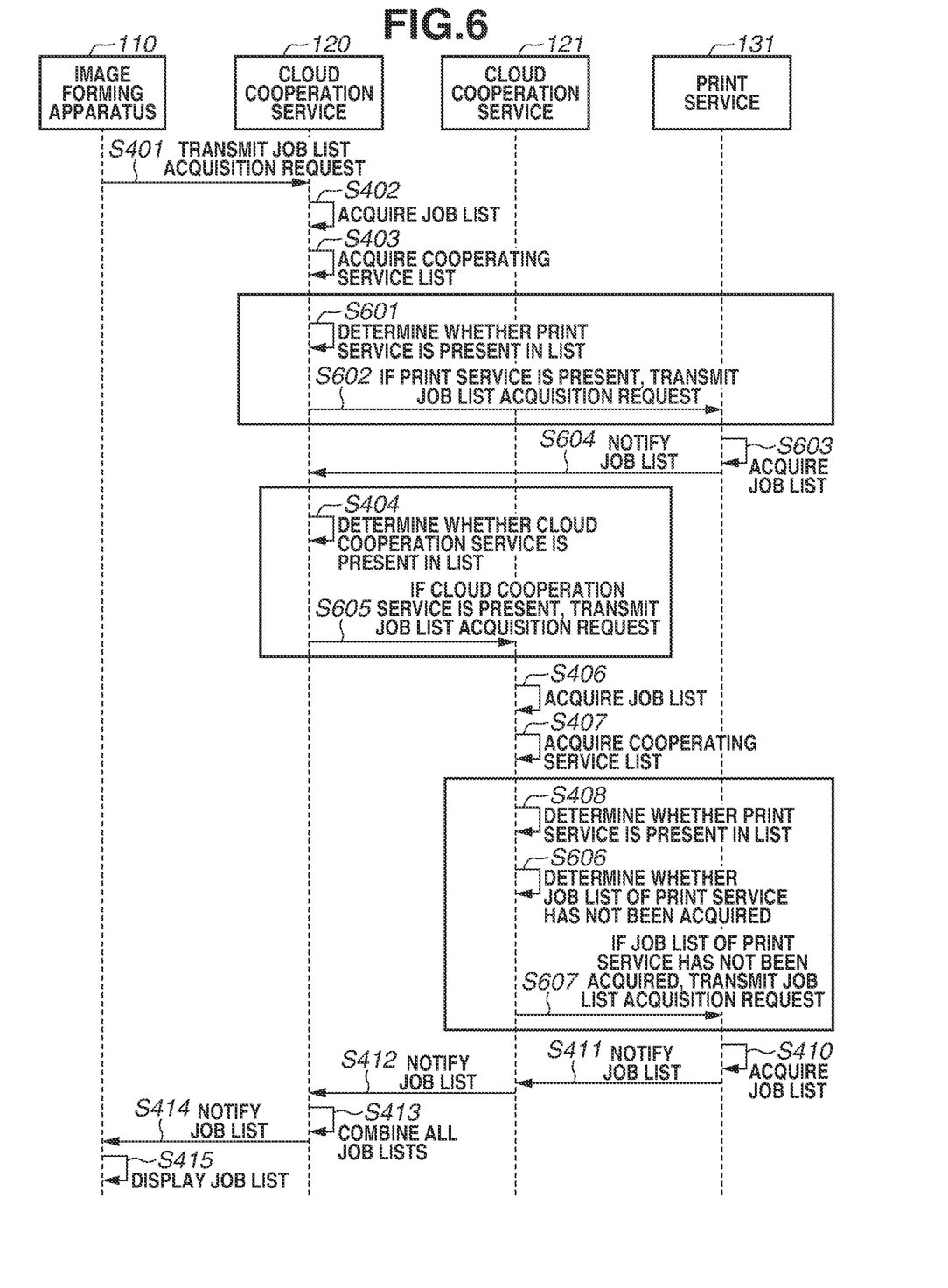
FIG. 6 is a sequence diagram illustrating processing among the apparatuses.

FIG. 6 is a sequence diagram illustrating details of processing that is performed by the cloud cooperation service 120 and relates to the redundant print job.

In step S601, the cloud cooperation service 120 determines whether the print service 131 is present in the service list (A). In a case where the cloud cooperation service 120 determines that the print service 131 is present, the processing proceeds to step S602. In a case where the cloud cooperation service 120 determines that the print service 131 is absent, the processing proceeds to step S404.

In step S602, the cloud cooperation service 120 transmits a job list acquisition request to the print service 131.

In step S603, the print service 131 acquires the job list (C) managed by the print service 131 itself.

In step S604, the print service 131 notifies the cloud cooperation service 120 of the job list (C).

In step S605, the cloud cooperation service 120 transmits, to the cloud cooperation service 121, a job list acquisition request of service cooperating with the cloud cooperation service 121. In this processing, data of the request contains the name of the print service acquired in step S602 and use account information.

In step S606, the cloud cooperation service 121 determines whether the job list of the print service determined in step S408 has not been acquired. The determination is performed based on information included in the data of the request transmitted in step S605. In a case where the service, the job list of which is to be acquired, and the use account information do not coincide with each other, the cloud cooperation service 121 determines that the job list has not been acquired. In a case where the cloud cooperation service 121 determines that the job list has not been acquired, the processing proceeds to step S607. In a case where the cloud cooperation service 121 determines that the job list has been already acquired, the processing proceeds to step S412. The information used for the determination is not limited the above described information as long as the information enables execution of the comparison processing performed in this step.

In step S607, the cloud cooperation service 121 transmits the job list acquisition request to the print service 131.

The method of displaying only the necessary print jobs on the UI panel of the image forming apparatus 110 based on the redundant service and the use account information is described above. As a result, the redundant print job is not acquired. This leads to an elimination of redundancy of a print job on the UI panel.

Other Embodiments

Embodiments of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-094840, which was filed on Jun. 13, 2022 and which is hereby incorporated by reference herein in its entirety.

What is claimed is:

1. A cloud system including a first cloud server, a second cloud server and a print apparatus,
wherein the print apparatus transmits a first acquisition request based on an operation of a user;
wherein the first cloud server comprises:
one or more memories storing instructions, and
one or more processors capable of executing the instructions causing the first cloud server to:
manage a first print job;
receive, from the print apparatus, the first acquisition request;
receive, from a first print service cooperating with the first cloud server, a second print job managed by the first print service;
receive, from the second cloud server, a third print job managed by a second print service cooperating with the second cloud server in a case where the second cloud server determines based on account information of the user that the first cloud server has not acquired the third print job; and
transmit, to the print apparatus, print job information related to the first print job, the second print job, and the third print job,
wherein the print apparatus displays a list of the first print job, the second print job, and the third print job based on the received print job information, the list including information specifying a service managing each print job on the list,
wherein the second print service does not cooperate with the first cloud server,
wherein the list including the third print job is transmitted from the first cloud server to the print apparatus, in a case where a user selection of the second print service cooperating with the second cloud server is received through a screen of the print apparatus, and
wherein the first cloud server receives, from the second cloud server, the third print job managed by the second print service, in a case where the first print service and the second print service is a same service and the second cloud server determines based on account information of the user that the first cloud server has not acquired the third print job, when the first print service and the second print service is a same service.

2. The cloud system according to claim 1, wherein the first cloud server further receives, from the second cloud server, another print job managed by the second cloud server, and transmits the print job information related to the another print job in addition to the first print job, the second print job and the third print job.

3. The cloud system according to claim 1, wherein the print apparatus displays the list including information specifying a service managing each print job on the list.

4. A method for a cloud system including a first cloud server, a second cloud server and a print apparatus, wherein the print apparatus transmits a first acquisition request based on an operation of a user, the method comprising:
managing a first print job;
receiving, from the print apparatus, the first acquisition request;
receiving, from a first print service cooperating with the first cloud server, a second print job managed by the first print service;
receiving, from the second cloud server, a third print job managed by a second print service cooperating with the second cloud server in a case where the second cloud server determines based on account information of the user that the first cloud server has not acquired the third print job;

transmitting, to the print apparatus, print job information related to the first print job, the second print job, and the third print job; and, receiving, from the second cloud server, the third print job managed by the second print service, in a case where the first print service and the second print service is a same service and the second cloud server determines based on account information of the user that the first cloud server has not acquired the third print job, when the first print service and the second print service is a same service, wherein the print apparatus displays a list of the first print job, the second print job, and the third print job based on the received print job information, the list including information specifying a service managing each print job on the list, wherein the second print service does not cooperate with the first cloud server, and wherein the list including the third print job is transmitted from the first cloud server to the print apparatus, in a case where a user selection of the second print service cooperating with the second cloud server is received through a screen of the print apparatus.

* * * * *